United States Patent
Suzuki et al.

(10) Patent No.: US 9,764,714 B2
(45) Date of Patent: Sep. 19, 2017

(54) VEHICULAR CONTROL DEVICE

(71) Applicants: DENSO CORPORATION, Kariya, Aichi-pref. (JP); NIPPON SOKEN, INC., Nishio, Aichi-pref. (JP)

(72) Inventors: Youichirou Suzuki, Nishio (JP); Akira Takaoka, Nishio (JP); Takashi Saitou, Nishio (JP); Masashi Mori, Kariya (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 0 days.

(21) Appl. No.: 15/100,466

(22) PCT Filed: Nov. 19, 2014

(86) PCT No.: PCT/JP2014/005798
§ 371 (c)(1),
(2) Date: May 31, 2016

(87) PCT Pub. No.: WO2015/083335
PCT Pub. Date: Jun. 11, 2015

(65) Prior Publication Data
US 2016/0297399 A1 Oct. 13, 2016

(30) Foreign Application Priority Data
Dec. 3, 2013 (JP) ................................ 2013-249767

(51) Int. Cl.
*G05B 19/00* (2006.01)
*B60R 25/24* (2013.01)
(Continued)

(52) U.S. Cl.
CPC .............. *B60R 25/24* (2013.01); *B60R 25/32* (2013.01); *E05F 15/70* (2015.01); *E05F 15/77* (2015.01); *E05Y 2900/531* (2013.01)

(58) Field of Classification Search
None
See application file for complete search history.

(56) References Cited

U.S. PATENT DOCUMENTS 6,542,071 B1  4/2003 Ohtsubo et al.
8,253,534 B2  8/2012 Nakazawa et al.
(Continued)

FOREIGN PATENT DOCUMENTS

JP  2001-234653  *  8/2001
JP  2001234653 A     8/2001
(Continued)

*Primary Examiner* — Adolf Dsouza
(74) *Attorney, Agent, or Firm* — Harness, Dickey & Pierce, P.L.C.

(57) ABSTRACT

In a vehicular control device, an operating intention detection unit is disposed on a tire or wheel rim of a vehicle to detect an operating intention of a user relative to an opening/closing body of the vehicle. An operating intention acquisition unit is disposed on the vehicle body of the vehicle to acquire the operating intention. An ID code acquisition unit acquires, from a mobile device carried by the user, an ID code that identifies the user or the mobile device. An ID code determination unit determines whether the ID code is correct. The condition establishment determination unit determines, based on the operating intention of the user and on the result of ID code determination, whether an output condition for outputting operating instruction information that designates an operation of the opening/closing body is established. An output unit outputs the operating instruction information when the output conditions are established.

9 Claims, 5 Drawing Sheets

(51) Int. Cl.
*B60R 25/32* (2013.01)
*E05F 15/70* (2015.01)
*E05F 15/77* (2015.01)

(56) References Cited

U.S. PATENT DOCUMENTS

2009/0216398 A1* 8/2009 Lynch .................. G01M 7/025
  701/29.5
2009/0224879 A1 9/2009 Nakazawa et al.
2016/0031273 A1 2/2016 Suzuki et al.

FOREIGN PATENT DOCUMENTS

| | | |
|---|---|---|
| JP | 2005306160 A | 11/2005 |
| JP | 2010-007357 A | 1/2010 |
| JP | 2010133099 A | 6/2010 |
| JP | 4561848 B2 | 10/2010 |
| JP | 2010243305 A | 10/2010 |
| JP | 2012017558 A | 1/2012 |
| JP | 2012-025253 A | 2/2012 |
| JP | 2012112196 A | 6/2012 |
| JP | 2013028903 A | 2/2013 |
| JP | 2013167150 A | 8/2013 |

* cited by examiner

VEHICULAR CONTROL DEVICE

CROSS REFERENCE TO RELATED APPLICATIONS

This application is a U.S. National Phase Application under 35 U.S.C. 371 of International Application No. PCT/JP2014/005798 filed on Nov. 19, 2014 and published as WO 2015/083335 A1 on Jun. 11, 2015. This application is based on and claims the benefit of priority from Japanese Patent Application No. 2013-249767 filed on Dec. 3, 2013. The entire disclosures of all of the above applications are incorporated herein by reference.

TECHNICAL FIELD

The present disclosure relates to a vehicular control device.

BACKGROUND ART

There is known a device that opens and closes a door of a vehicle without requiring a user of the vehicle to directly apply the force of the user to the vehicle door. For example, devised is a vehicle door opening/closing device that operates the vehicle door by allowing a sensor unit disposed on the outer surface of the vehicle to detect the movement of the user in a non-contact manner (refer to Patent Literature 1).

Further, devised is an electronic key system (also referred to as a smart system or a key-less entry system) that permits the vehicle door to be locked or unlocked when a mobile device carried by the user is properly verified and a pneumatic pressure change in each tire of the vehicle is determined to be in agreement with a predetermined change pattern (refer to Patent Literature 2).

PRIOR ART LITERATURE

Patent Literature

Patent Literature 1: JP 2013-028903 A
Patent Literature 2: JP 2012-112196 A

SUMMARY OF INVENTION

The configuration described in Patent Literature 1 entails an increased cost because it requires the installation of a proximity sensor for detecting the presence of a human body within a predetermined range and a motion sensor for detecting the swing direction of a human hand.

The configuration described in Patent Literature 2 also entails an increased cost because a pneumatic pressure change caused when a tire is vibrated by a human is known to be minute and the use of a highly sensitive pneumatic pressure sensor is required. Particularly, a tire pneumatic pressure monitoring device is mainly designed for monitoring a tire pneumatic pressure during the travel of the vehicle. Further, the pneumatic pressure sensor and other devices for the tire are driven by a battery. Thus, if a pneumatic pressure is monitored while the vehicle is parked, the battery becomes exhausted quickly.

The present disclosure has been made in view of the above circumstances. An object of the present disclosure is to provide a vehicular control device that is capable of driving an opening/closing body, such as a door of a vehicle, to open or close with a simple, lower-cost configuration even when both hands of a user are occupied, for example, by baggage.

According to an aspect of the present disclosure, there is provided a vehicular control device that includes an operating intention detection unit, an operating intention acquisition unit, an ID code acquisition unit, an ID code determination unit, a condition establishment determination unit, and an output unit. The operating intention detection unit is disposed on a tire or wheel rim of a vehicle to detect an operating intention of a user relative to an opening/closing body that is attached to the vehicle to open and close in a predefined manner. The operating intention acquisition unit is disposed on the vehicle body of the vehicle to acquire the operating intention. The ID code acquisition unit is disposed on the vehicle body of the vehicle and acquires, from a mobile device carried by the user, an ID code that identifies the user or the mobile device. The ID code determination unit is disposed on the vehicle body of the vehicle and determines whether the ID code is correct. The condition establishment determination unit is disposed on the vehicle body of the vehicle and determines, based on the operating intention of the user and on the result of ID code determination, whether an output condition for outputting operating instruction information that designates an operation of the opening/closing body is established. The output unit is disposed on the vehicle body of the vehicle and outputs the operating instruction information when the output condition is established.

Employing the above-described configuration makes it possible to achieve a configuration according to the present disclosure at a relatively low cost without having to incorporate a motion sensor. The above-described configuration also eliminates the need for a highly sensitive pneumatic pressure sensor.

BRIEF DESCRIPTION OF DRAWINGS

The above and other objects, features, and advantages of the present disclosure will become more apparent from the following detailed description made with reference to the accompanying drawings, in which.

DESCRIPTION OF EMBODIMENTS

Figure 1:
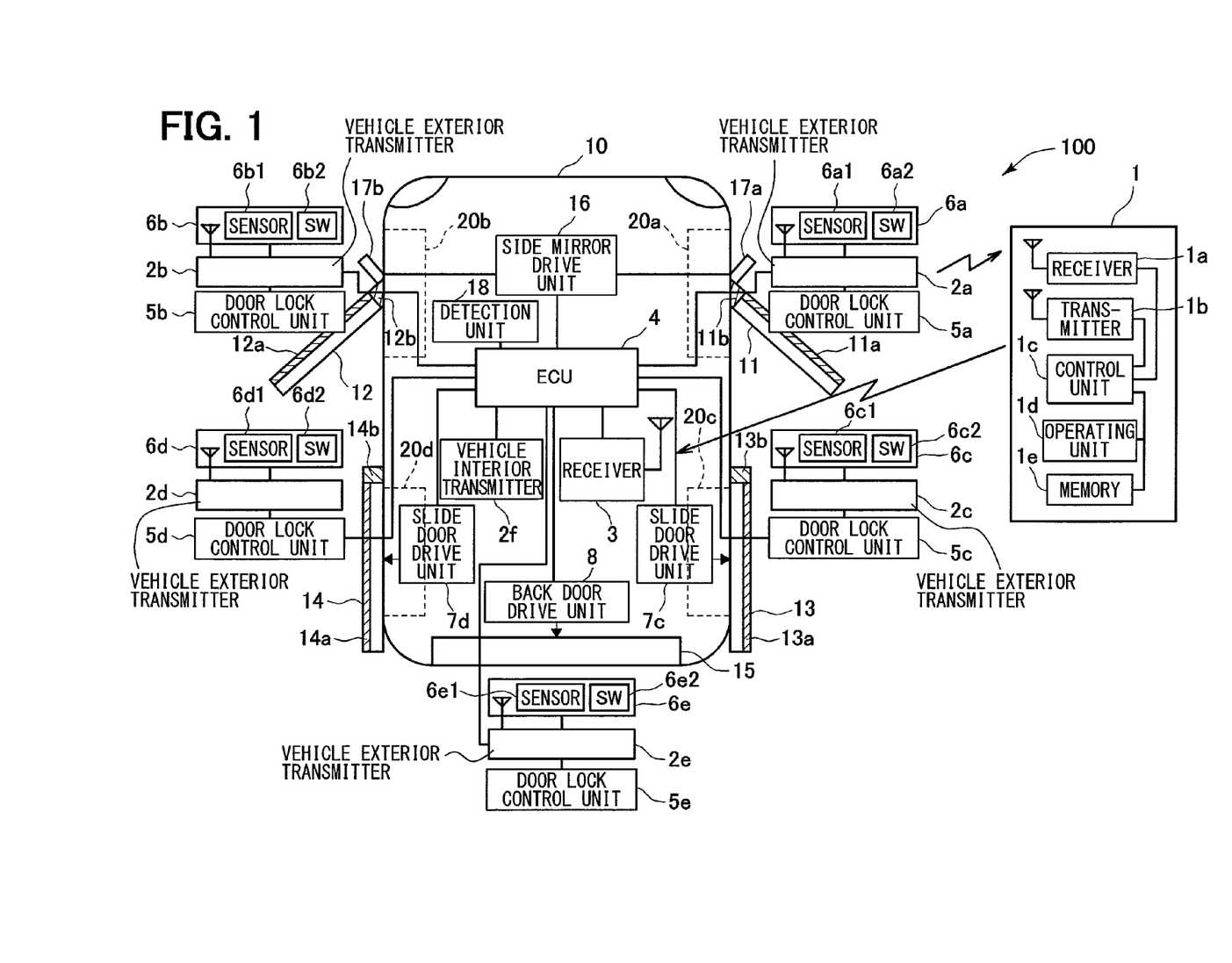
FIG. 1 is a diagram illustrating a configuration of a vehicular control device according to an embodiment of the present disclosure.

FIG. 1 illustrates an exemplary overall configuration of a vehicular control device 100 according to an embodiment of the present disclosure. The configuration of a smart system, which is a part of the configuration depicted in FIG. 1, is disclosed in detail in Japanese Patent No. 4561848 (U.S. Pat. No. 8,253,534). Therefore, the outline configuration of the smart system is incorporated herein by reference.

The vehicular control device 100 is configured so that an ECU 4 (corresponding to an ID code determination unit, a condition establishment determination unit, an output unit, a vehicle status acquisition unit, a position determination unit, a selection unit, a collation unit, and an operation permission unit) controls the operation of an opening/closing body (described in detail later) on the basis of an operating intention of a user, the status of a vehicle 10, and the result of ID code verification via bidirectional communication between a mobile device 1 carried by the user and a vehicle unit attached to a vehicle body of the vehicle 10.

The mobile device 1 includes a control unit 1*c*, a receiver 1*a*, a transmitter 1*b*, an operating unit 1*d*, and a memory 1*e*. The control unit 1*c* includes a well-known CPU, ROM, and RAM (not shown). The receiver 1*a* is connected to the control unit 1*c* to receive a polling signal from the vehicle unit. The transmitter 1*b* transmits a response signal, which includes an ID code, in order to respond to the polling signal. The operating unit 1*d* is used by the user to perform an operation. The memory 1*e* stores programs necessary for the operation of the mobile device 1 and data such as the ID code.

The control unit 1*c* determines, based on a signal received by the receiver 1*a*, whether a polling signal is received, generates a response signal, which includes an ID code for collation and is used to respond to the polling signal, and causes the transmitter 1*b* to transmit the generated response signal.

The operating unit 1*d* includes, for example, push switches that trigger the use of a remote key-less entry function. Depending on how the operating unit 1*d* is operated, the transmitter 1*b* transmits a command signal that requests doors 11-14 to lock, unlock, open, or close or a back door 15 to unlock, open, or close.

A smart key, a tablet terminal (a generic name of a finger-driven mobile information terminal having a touch panel type liquid-crystal display) represented by a well-known smartphone, a mobile communication terminal such as a mobile phone, or a dedicated mobile terminal exclusively designed to transmit an ID code in response to a polling signal may be used as the mobile device 1.

The ECU 4 is connected to vehicle exterior transmitters 2*a*-2*e* (corresponding to polling signal output units) disposed on the doors 11-15, a vehicle interior transmitter 2*f* (corresponding to a polling signal output unit) disposed in a vehicle interior, and a receiver 3 (corresponding to an operating intention acquisition unit, an ID code acquisition unit, and an ID code reception unit) disposed in the vehicle interior. The vehicle unit includes at least the ECU 4, the vehicle exterior transmitter (the generic name of the vehicle exterior transmitters 2*a*-2*e*; this applies hereinafter), the vehicle interior transmitter 2*f*, and the receiver 3.

Further, the ECU 4 is data-communicatively connected to door lock control units 5*a*-5*e* disposed on the doors 11-15, slide door drive units 7*c*, 7*d*, window drive units 11*b*-14*b*, a side mirror drive unit 16, and a vehicle status detection unit 18 (marked "DETECTION UNIT" in FIG. 1). These connections may be established by using either an in-vehicle LAN or a direct-connection method.

The ECU 4 is configured as a computer that includes a well-known CPU, ROM, and RAM (not shown) and a peripheral circuit. For example, various functions of the vehicular control device are implemented when the CPU executes control programs stored in the ROM.

The vehicle exterior transmitters and the vehicle interior transmitter 2*f* transmit a polling signal on the basis of a transmission instruction signal from the ECU 4. The distance traveled by the polling signal is set, for example, at approximately 0.7 to 1.0 m. While the vehicle 10 is parked, a detection area based on the distance traveled by the polling signal is formed around each of the doors 11-15 so as to detect which door is approached by a user of the mobile device 1. Further, the detection area provided by the vehicle interior transmitter 2*f* is set to cover the vehicle interior in order to detect whether the mobile device 1 is in the vehicle interior.

The receiver 3 becomes ready to receive a response signal from the mobile device 1 at the same time a transmission instruction signal for the polling signal is outputted to the vehicle exterior transmitters and the vehicle interior transmitter 2*f*. The response signal received by the receiver 3 is outputted to the ECU 4. The ECU 4 collates an ID code included in the received response signal with a master code stored in the ECU 4, and determines based on the result of collation whether or not to execute control in order to, for example, lock or unlock the doors.

The above-described configuration is a configuration where "the ID code acquisition unit and the ID code determination unit respectively serve as an ID code reception unit and a collation unit of a smart system, the smart system including a polling signal output unit (2*a*-2*e*, 2*f*), which wirelessly outputs a polling signal for polling the mobile device, the ID code reception unit (3), which receives an ID code transmitted from the mobile device on the basis of the reception of the polling signal, the collation unit (4), which collates the received ID code with a master code stored in the collation unit, and an operation permission unit (4), which permits a predetermined operation on the basis of the result of collation." As the above-described configuration permits the use of the functions of the smart system, the configuration of the present disclosure can be implemented at a lower cost.

Obviously, the present disclosure may alternatively be configured without sharing the functions (for example, a function of permitting the predetermined operation on the basis of the result of ID code collation) with the smart system. The use of such an alternative configuration makes it possible to implement the functions of the present disclosure in a vehicle without the smart system.

Figure 3:
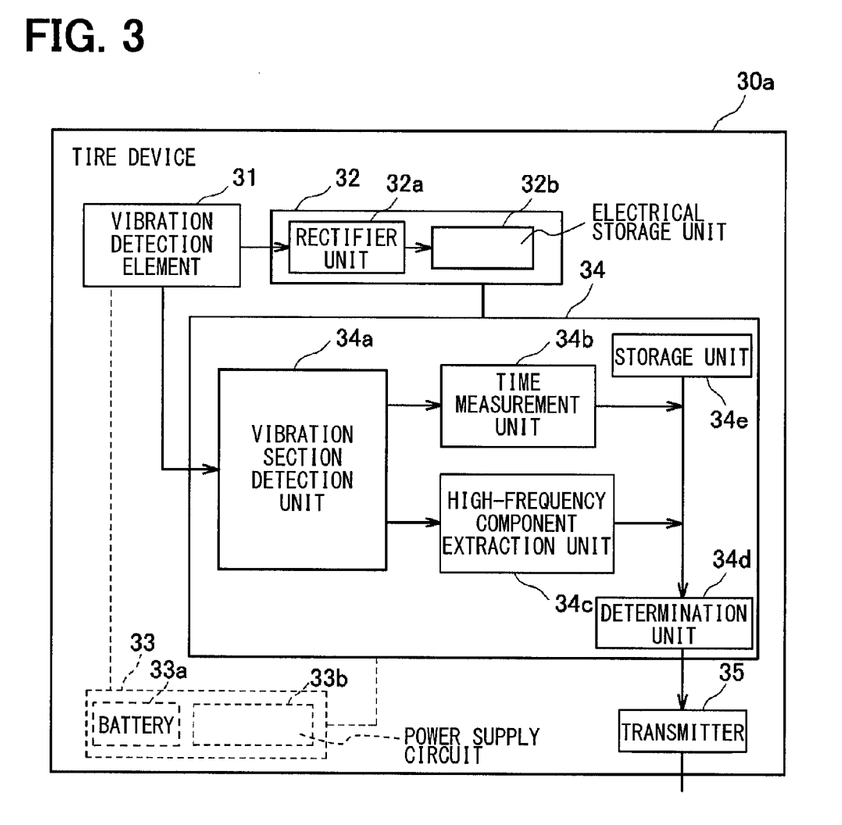
FIG. 3 is a diagram illustrating a configuration of a tire device of the vehicular control device.

The receiver 3 receives operating intention information from the tire device 30*a* (see FIG. 3). The received operating intention information is outputted to the ECU 4.

The door lock control units (the generic name of the door lock control units 5*a*-5*e*) lock or unlock the doors 11-15 upon receipt of an instruction signal from the ECU 4. When the user of the mobile device 1 touches a door handle 6*a*-6*e* of a locked door 11-15, a door lock control unit places the door 11-15 in an unlock standby state where the door 11-15 can be unlocked.

The door handles (the generic name of the door handles 6*a*-6*e*; this applies hereinafter) are provided with touch sensors (marked "SENSOR" in FIG. 1) 6*a*1-6*e*1. The touch sensor detects that the user of the mobile device 1 has touched a door handle and performed a predetermined operation. The door handles are also provided with a door lock switch (marked "SW" in FIG. 1) 6*a*2-6*e*2 (an example of a door lock device). The door lock switch is a push switch used to lock a door 11-15. Further, the door handles 6*a*-6*e* also operate an antenna for the vehicle exterior transmitter 2*a*-2*e*.

The slide door drive units 7*c*, 7*d* are motor-driven. Upon receipt of an opening/closing signal from the ECU 4, the slide door drive units 7*c*, 7*d* automatically open or close respective sliding doors (hereinafter referred to as the "slide doors") 13, 14 of a rear seat of the vehicle 10. It should also be noted that hinged doors 11, 12 are provided for a front seat of the vehicle 10.

A back door drive unit 8 is motor-driven. Upon receipt of an opening/closing signal from the ECU 4, the back door drive unit 8 automatically opens or closes the flip-up or sideway opening back door 15. The back door 15 may be provided with a window and a window drive unit.

The window drive units (the generic name of the window drive units 11*b*-14*b*; this applies hereinafter) drive windows 11*a*-14*a* of the doors 11-14 to open or close. The window drive units are capable of not only driving the windows to open or close in response to an operation of an operating switch (not shown) but also driving the windows to open or close in compliance with a control command from the ECU 4.

The side mirror drive unit 16 drives side mirrors 17*a*, 17*b* to open or close. The side mirror drive unit 16 is capable of not only driving the side mirrors (the generic name of the side mirrors 17*a*, 17*b*; this applies hereinafter) in response to a user operation of an operating switch (not shown) but also driving the side mirrors to open or close in compliance with a control command from the ECU 4.

The door lock switches 6*a*2-6*e*2, the windows 11*a*-14*a*, the slide doors 13, 14, the back door 15, and the side mirrors 17*a*, 17*b* correspond to opening/closing bodies. As the above-described configuration is employed, main opening/closing bodies attached to the vehicle are subjected to drive control when a tire is vibrated.

For the opening/closing bodies, a first state and a second state are defined as described below (with the reference numerals omitted).

Door lock switch: An unlocked state (where the switch is closed) is defined as the first state, and a locked state (where the switch is open) is defined as the second state.

Window: A closed state is defined as the first state, and an open state is defined as the second state. The degree of opening (fully open, half open, etc.) in the open state can be set as desired.

Slide door and back door: A closed state is defined as the first state, and an open state is defined as the second state. The degree of opening in the open state can be set as desired, as is the case with the window.

Side mirror: A closed (folded) state is defined as the first state, and an open (unfolded) state is defined as the second state.

The vehicle status detection unit 18 includes at least one of the following vehicle status detection sensors or switches.

A gearshift position sensor that detects the position of a gearshift lever (not shown) of the vehicle 10.

A vehicle speed sensor that detects the speed of the vehicle 10.

A parking brake switch that detects the status of a parking brake (not shown) of the vehicle 10.

A tachometer that detects the rotating speed of a prime mover (including at least either an engine or a motor; not shown) of the vehicle 10.

A starter switch (for example, an ignition switch) that permits the prime mover of the vehicle 10 to start.

A configuration of wheels (the generic name of wheels 20*a*-20*d*; this applies hereinafter) will now be described with reference to FIG. 2. As an example, the configuration of the wheel 20*a* is described below. The wheel 20*a* includes a tire 21*a* and a wheel rim 22*a*. The tire device 30*a* (corresponding to an operating intention detection unit) is disposed on the inside of the tire 21*a*, for example, on the rear surface of a tread of the tire 21*a* (the front surface comes into contact with a road surface), and positioned close to the center in the width direction of the tire. The tire device 30*a* may be disposed on the inside of the wheel rim 22*a* as indicated at 40*a*.

As illustrated in FIG. 3, the tire device 30*a* includes a vibration detection element 31, an electrical power supply circuit 32 or 33, a signal processing circuit 34, and a transmitter 35.

Figure 2:
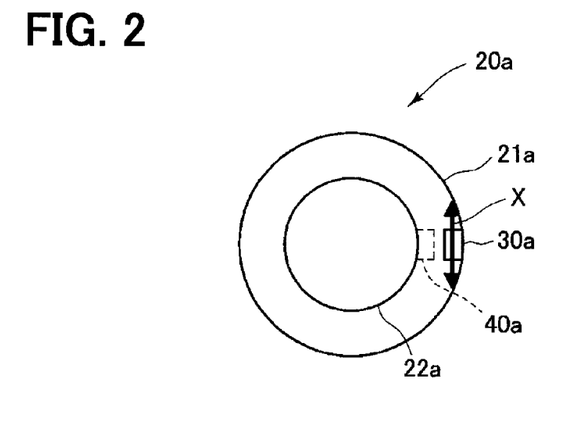
FIG. 2 is a diagram illustrating a configuration of a wheel.

The vibration detection element 31 detects vibration in a direction (a tire tangential direction, that is, the direction of arrow X in FIG. 2) in which, for example, a circular path followed by the tire device 30*a* when the tire 21*a* rotates is in contact. Either of the following elements may be used as the vibration detection element 31.

An element that does not require the supply of external electrical power: A vibration energy generation element that converts vibration energy to electrical energy. An electrostatic induction power generation element, a piezoelectric element, a friction power generation element, a magnetostrictive power generation element, or an electromagnetic induction power generation element may be used.

An element that requires the supply of external electrical power: A strain gauge, a semiconductor acceleration sensor, or a differential transformer.

The above-described configuration is a configuration where "the operating intention detection unit includes a vibration detection element (31)." The above-described configuration makes it possible to detect the operating intention of the user with a simple configuration.

When a vibration detection element that requires the supply of external electrical power (for example, includes an amplifier circuit or other peripheral circuit in addition to the element) is employed or a vibration energy generation element that cannot generate electrical power as needed to supply electrical power required for operating the tire device 30*a* is employed, the electrical power supply circuit 33 includes a well-known battery 33*a* and a power supply circuit 33*b* that converts, for example, the voltage of the battery 33*a* to operating voltages for various units, and supplies the electrical power of the battery 33*a* to the signal processing circuit 34 and the transmitter 35 through the power supply circuit 33*b*.

When a vibration detection element requiring no external electrical power supply or a vibration energy generation element is employed, the electrical power supply circuit 32 includes a rectifier unit 32*a* and an electrical storage unit 32*b*, and supplies electrical power generated by the vibration detection element 31 to the signal processing circuit 34 and the transmitter 35. In the above-described configuration, the tire device 30*a* operates on electrical power generated by vibration.

The rectifier unit 32*a* converts AC power generated by the vibration detection element 31 to DC power, and outputs the DC power to the electrical storage unit 32*b*. A publicly-known full-wave rectifier circuit or half-wave rectifier circuit may be used for the rectifier unit 32*a*. The electrical storage unit 32*b* is a circuit that stores the DC power outputted from the rectifier unit 32*a* and includes, for example, a well-known capacitor. When the vibration detection element 31 is generating an excessive amount of electrical power, the electrical storage unit 32*b* stores the excess portion. When the vibration detection element 31 is not generating an adequate amount of electrical power, the electrical storage unit 32*b* is discharged to compensate for the inadequacy.

The signal processing circuit 34 includes a well-known CPU, ROM, RAM, and signal input/output circuit and a bus connecting these elements. The signal processing circuit 34 includes various functional blocks for signal processing, namely, a vibration section detection unit 34a, a time measurement unit 34b, a high-frequency component extraction unit 34c, a determination unit 34d, and a storage unit 34e such as a flash memory. The signal processing circuit 34 acquires vibration data from the vibration detection element 31, checks the acquired vibration data to determine whether vibration is given to the wheel (indicative of the operating intention of the user) while the vehicle 10 is parked, and outputs the result of determination.

If the output voltage of the vibration detection element 31 exceeds a predetermined value (may be smaller than a value used for later-described vibration detection determination), the electrical power supply circuit 32 or 33 outputs a wake-up signal (may be a pulse signal or a rising or falling edge signal), separately from a voltage value, to the signal processing circuit 34. The signal processing circuit 34 is triggered by the wake-up signal to wake up, that is, switch from a power-saving mode (referred to also as the sleep mode) to a regular operating mode. The power consumption in the power-saving mode is lower than in the regular operating mode. If, by contrast, the output voltage of the vibration detection element 31 remains lower than the above-mentioned predetermined value for a predetermined period of time and no processing is performed by the signal processing circuit 34, the signal processing circuit 34 enters the power-saving mode or stops operating. This decreases the power consumption of the tire device 30a and reduces the burden on the electrical storage unit 32b or the battery 33a.

The vibration section detection unit 34a detects a vibration section. The vibration section is a section in which the output voltage of the vibration detection element 31 is higher than a predetermined value. The time measurement unit 34b measures the length of time of the vibration section detected by the vibration section detection unit 34a. The high-frequency component extraction unit 34c uses, for example, a wavelet filter or a publicly-known high-pass filter to extract a high-frequency component (high-frequency vibration data) of the vibration section. The determination unit 34d determines the cause of vibration on the basis of the length of time of the vibration section, which is measured by the time measurement unit 34b, and on the high-frequency component extracted by the high-frequency component extraction unit 34c. If the vibration is caused by the operating intention of the user, the determination unit 34d outputs operating intention information indicative of the cause of vibration to the transmitter 35. The storage unit 34e stores a program and data that the determination unit 34d uses to determine the operating intention.

The transmitter 35 transmits to the vehicle unit the operating intention information outputted from the determination unit 34d of the signal processing circuit 34. Communication is established between the transmitter 35 and the receiver 3 in the vehicle unit by using a publicly-known near-field communication technology such as Bluetooth (registered trademark).

Figure 4:
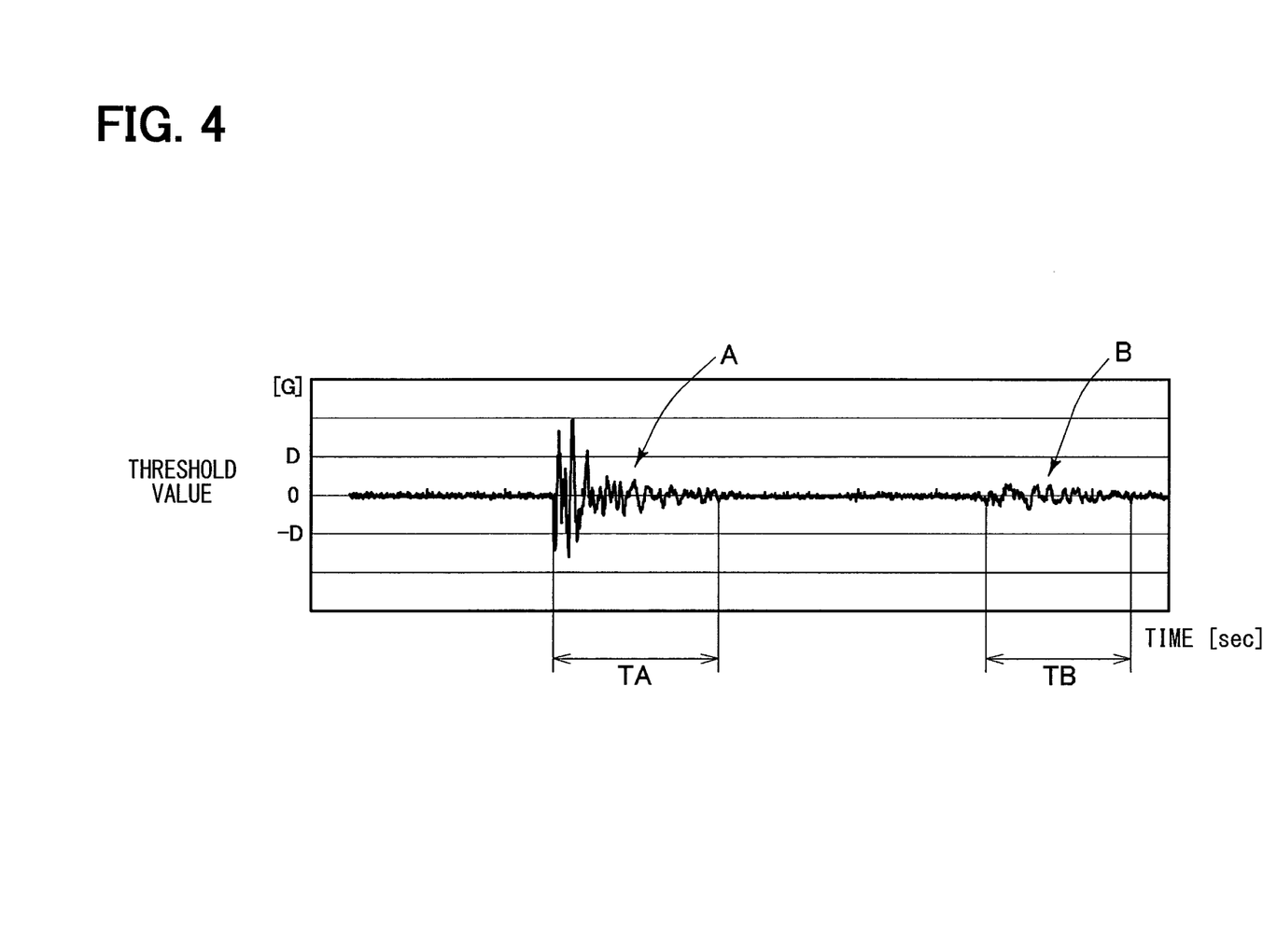
FIG. 4 is a diagram illustrating the determination of vibration.

FIG. 4 illustrates output voltages that are generated from the vibration detection element 31 and measured by the inventors of the present disclosure when the wheel is vibrated by the user (when, for instance, the wheel is kicked by the user) and when a door is closed. As is obvious from FIG. 4, the vibration (waveform A) caused by a force directly applied to the wheel when, for instance, the wheel is vibrated by the user differs in the amplitude, the length of time of a vibration section (TA, TB), and the high-frequency component from the vibration (waveform B) caused by a force applied to the wheel through the vehicle body when, for instance, a door is closed. Such a difference is utilized to determine whether the user intends to enter the vehicle.

Figure 5:
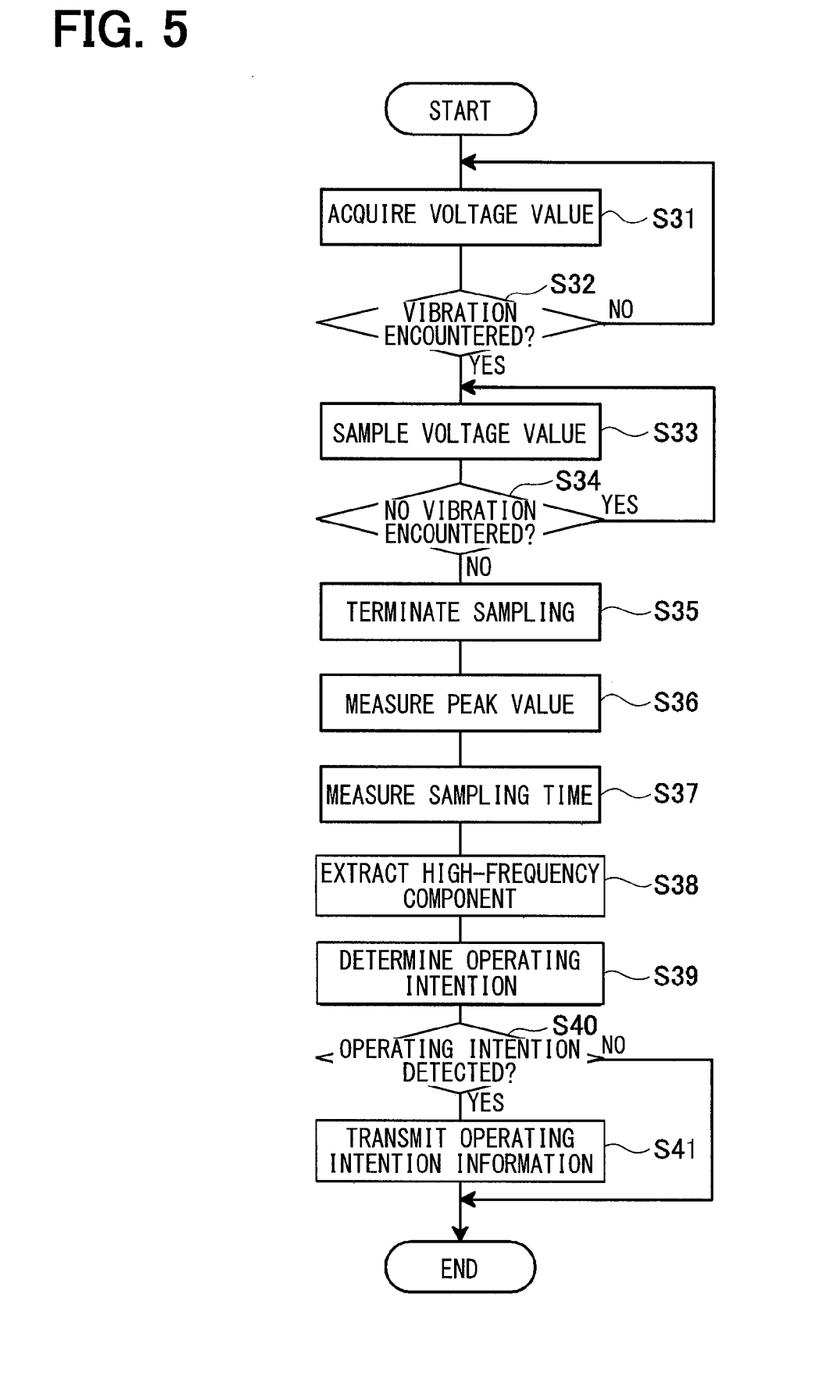
FIG. 5 is a flowchart illustrating an operating intention information output process of the vehicular control device.

An operating intention information output process that is performed in the regular operating mode by the signal processing circuit will now be described with reference to FIG. 5. First of all, the voltage value outputted from the vibration detection element 31 is acquired (S31). Next, it is determined whether vibration is encountered, that is, whether a value prevailing when no vibration is encountered is continuously exceeded by the outputted voltage value for a predetermined period of time. If the voltage value is changed (S32: YES), the voltage value is sampled (S33). More specifically, the voltage value outputted from the vibration detection element 31 is acquired and stored in the storage unit 34e. If, by contrast, no vibration is encountered, that is, the voltage value reverts to a value prevailing when no vibration is encountered (S34: YES), the sampling of the voltage value terminates (S35).

Next, S36, S37, and S38 are performed by using the result of sampling (that is, the vibration data). More specifically, the vibration section detection unit 34a measures a peak value (S36), the time measurement unit 34b measures a sampling time (the length of time of the vibration section) (S37), and the high-frequency component extraction unit 34c extracts the high-frequency component (S38).

Next, detection of the operating intention of the user, that is, determination whether the vibration is caused by the user (S39) is performed. For example, the length of time of a vibration section in which the wheel is vibrated by the user, the amplitude, and the high-frequency component are measured in advance and stored in the storage unit 34e as a reference value or as a reference range. If a measured value is in agreement with the reference value or within the reference range, it is determined that the vibration is caused by the user.

Referring to FIG. 4, a threshold value is D (absolute value), the length of time of the vibration section is TA±α (α: reference range defining value), and the high-frequency component extracted from waveform A is the reference value or the reference range.

Returning to FIG. 5, if the operating intention of the user is not detected (S40: NO), the process terminates. If, by contrast, the operating intention of the user is detected (S40: YES), the operating intention information is generated and transmitted from the transmitter 35 (S41). If wheel identification information for identifying a wheel is stored in the storage unit 34e, the wheel identification information may be incorporated into the operating intention information and transmitted.

Figure 6:
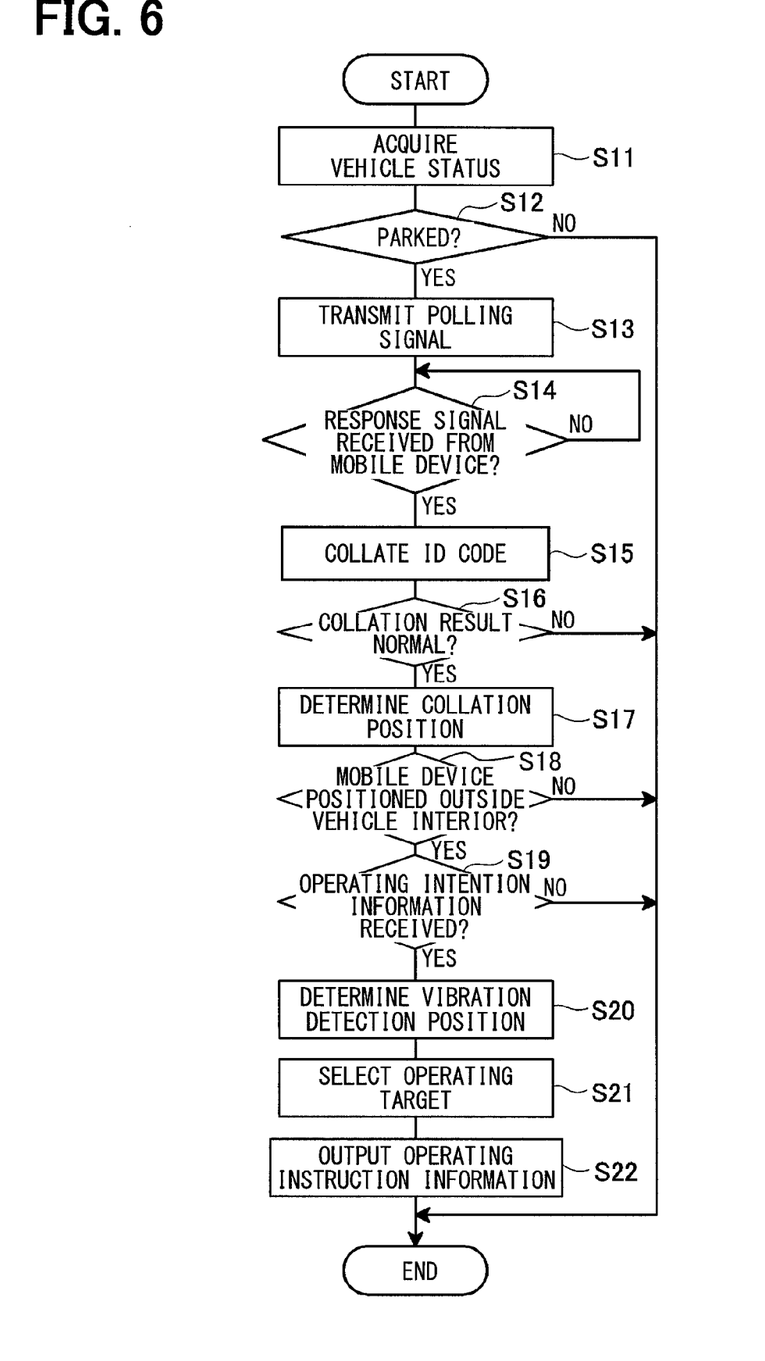
FIG. 6 is a flowchart illustrating an operating instruction information output process of the vehicular control device.

An operating instruction information output process that is repeatedly performed at a predetermined point of time by the ECU 4 will now be described with reference to FIG. 6. First of all, a vehicle status detected by the vehicle status detection unit 18 is acquired (S11). Next, it is determined, based on the vehicle status, whether the vehicle 10 is parked. At least one of the following determination methods is used:
  When the gearshift position sensor of the vehicle 10 indicates that the parking position is selected, it is determined that the vehicle 10 is parked.
  When the speed of the vehicle 10 is 0 km/h, it is determined that the vehicle 10 is parked.
  When the parking brake of the vehicle 10 is activated, it is determined that the vehicle 10 is parked.

When the rotating speed of the prime mover of the vehicle 10 is 0 rpm, it is determined that the vehicle 10 is parked.

When the starter switch of the vehicle 10 is off, it is determined that the vehicle 10 is parked.

The above-described configuration corresponds to "a vehicle status acquisition unit (4) that acquires the status of the vehicle; wherein the condition establishment determination unit makes a determination when the vehicle is in a predefined state." More specifically, "the condition establishment determination unit makes a determination when the vehicle is parked." The above-described configuration prevents the opening/closing bodies from operating against the intention of the user when a tire of a traveling vehicle vibrates.

If the vehicle 10 is not parked (S12: NO), the process terminates. If, by contrast, the vehicle 10 is parked (S12: YES), the transmission instruction signal is sent to the vehicle exterior transmitters and the vehicle interior transmitter 2f to transmit a polling signal (S13).

When a response signal for the polling signal is received from the mobile device 1 (S14: YES), the ID code included in the received response signal is collated with the internally stored master code (S15). If the ID code does not agree with the master code (S16: NO), the process terminates.

If, by contrast, the ID code agrees with the master code (S16: YES), the result of collation is determined to be normal so that the current position of the mobile device 1 is identified (S17). More specifically, it is determined which transmitter (vehicle exterior transmitter or vehicle interior transmitter) has transmitted the polling signal that is responded to by the response signal received when the result of collation is determined to be normal.

If the mobile device 1 exists in the vehicle interior (S18: NO), the process terminates. If, by contrast, the mobile device 1 exists outside of the vehicle interior (S18: YES), it is determined whether the operating intention information is received from a wheel. If no operating intention information is received (S19: NO), the process terminates.

The above-described configuration corresponds to "a position determination unit (4) that determines the position of the mobile device; wherein the condition establishment determination unit makes a determination when the mobile device does not exist in the interior of the vehicle." When the mobile device exists in the interior of the vehicle, it is conceivable that the user has entered the vehicle to perform a certain operation. The above-described configuration avoids a conflict with an operation performed by the user in the vehicle.

If operating intention information is received (S19: YES), the position of a wheel whose vibration is detected is determined (S20). When collation is normally performed and the operating intention information is received, the output conditions for outputting operating instruction information are established. The position of the wheel is determined by using at least one of the following methods:

A wheel positioned closest to the mobile device when the collation is normally performed is the wheel whose vibration is detected. Unlike the configuration including the wheel identification information, there is no need to associate the wheel identification information with a wheel position.

When the operating intention information includes the wheel identification information, the position of the wheel is determined based on the wheel identification information. In this instance, the association between the wheel identification information and the position of the wheel is pre-registered in the ECU 4. If wheels are rotated, the association needs to be registered again for each wheel.

The position of the wheel is determined from the intensity of a radio wave that is transmitted from the transmitter 35 and received by the receiver 3.

Next, an operating target is selected from the aforementioned opening/closing bodies (S21). One of the following selection methods is used:

Only a particular opening/closing body (for example, a slide door 13, 14 only) is selected as the operating target.

The association between a wheel vibration pattern and an opening/closing body targeted for operation is pre-stored in a memory of the ECU 4. This makes it possible to simultaneously operate a plurality of opening/closing bodies. Further, a wheel close to a driver's seat may be vibrated to unlock a door for a front passenger seat.

The association between the position of a wheel whose vibration is detected and an opening/closing body targeted for operation is pre-stored in a memory of the ECU 4. For example, a door close to a wheel whose vibration is detected is locked, unlocked, opened, or closed.

The above-described two configurations correspond to "a selection unit (4) that selects, based on the detected operating intention, an opening/closing body whose operation is to be designated." The above-described configurations permit the user to open or close a desired opening/closing body without performing an operation other than vibrating a tire.

A position at which the mobile device 1 was placed when collation was normally performed is associated with an opening/closing body targeted for operation, and the resulting association is pre-stored in a memory of the ECU 4. A plurality of opening/closing bodies can be simultaneously operated. This configuration corresponds to "a position determination unit (4) that determines the position of the mobile device; and a selection unit (4) that selects, based on the position of the mobile device, an opening/closing body whose operation is to be designated." This configuration also permits the user to open or close a desired opening/closing body without performing an operation other than vibrating a tire.

Finally, the operating instruction information is outputted to a drive unit of the opening/closing body targeted for operation (S22). The operating instruction information includes an instruction for cyclically switching between the first state and the second state.

The above-described configuration corresponds to a configuration where "a first state and a second state are predefined for the opening/closing body, the second state being different from the first state; and wherein the operating instruction information includes an instruction for cyclically switching between the first state and the second state." The above-described configuration prevents opening/closing body status management from being complicated.

For example, the status of each opening/closing body is acquired at a predetermined point of time and stored in a memory of the ECU 4, and the operating instruction information is outputted to give an instruction for switching from the first state to the second state or from the second state to the first state.

Alternatively, the drive unit for each opening/closing body (door lock control unit 5a-5e, window drive unit 11b-14b, slide door drive unit 7c, 7d, back door drive unit 8, or side mirror drive unit 16) may manage the status of the opening/closing body, and upon receipt of the operating instruction information, may drive the opening/closing body to switch from the first state to the second state or from the second state to the first state.

While the embodiment of the present disclosure has been described above, it is illustrative and not restrictive. The present disclosure is not limited to the above-described embodiment, but may be variously modified based on the knowledge of those skilled in the art without departing from the spirit of the present disclosure.

What is claimed is:

1. A vehicular control device comprising:
an operating intention detection unit that is disposed on a tire or wheel rim of a vehicle and detects an operating intention of a user relative to an opening/closing body that is attached to the vehicle to open and close in a predefined manner;
an operating intention acquisition unit that is disposed on a vehicle body of the vehicle and acquires the operating intention;
an ID code acquisition unit that is disposed on the vehicle body of the vehicle and acquires, from a mobile device carried by the user, an ID code that identifies the user or the mobile device;
an ID code determination unit that is disposed on the vehicle body of the vehicle and determines whether the ID code is correct;
a condition establishment determination unit that is disposed on the vehicle body of the vehicle and determines, based on the operating intention of the user and on the result of ID code determination, whether an output condition for outputting operating instruction information that designates an operation of the opening/closing body is established; and
an output unit that is disposed on the vehicle body of the vehicle and outputs the operating instruction information when the output condition is established, wherein
the operating intension detection unit includes:
a vibration detection element that detects a vibration of the tire;
a signal processing circuit that processes a signal output from the vibration detection element; and
an operating mode switching unit that switches the signal processing circuit to a regular operating mode when an output of the vibration detection element exceeds a predetermined value, and switches the signal processing circuit to a power-saving mode in which a power consumption is lower than in the regular operating mode when the output of the vibration detection element is lower than the predetermined value for a predetermined period of time and no processing is performed by the signal processing circuit,
wherein the operating intention detection unit measures, in advance, a length of time, an amplitude, and a high-frequency component of a vibration section output from the vibration detection unit when the tire or the wheel rim is vibrated by the user,
wherein the operation intention detection unit includes a storage unit that stores measurement results of the length of time, the amplitude and the high-frequency component of the vibration section as a reference range or a reference value, and
wherein the signal processing circuit determines that the vibration of the tire is caused by the user when the output of the vibration detection element is in agreement with the reference value or within the reference range.

2. The vehicular control device according to claim 1, further comprising:
a vehicle status acquisition unit that acquires a status of the vehicle,
wherein the condition establishment determination unit makes a determination when the vehicle is in a predefined state.

3. The vehicular control device according to claim 2, wherein the condition establishment determination unit makes a determination when the vehicle is parked.

4. The vehicular control device according to claim 2, further comprising:
a position determination unit that determines a position of the mobile device;
wherein the condition establishment determination unit makes a determination when the mobile device does not exist in the interior of the vehicle.

5. The vehicular control device according to claim 1, further comprising:
a selection unit that selects, based on the detected operating intention, an opening/closing body whose operation is to be designated.

6. The vehicular control device according to claim 1, further comprising:
a position determination unit that determines a position of the mobile device; and
a selection unit that selects, based on the position of the mobile device, an opening/closing body whose operation is to be designated.

7. The vehicular control device according to claim 1,
wherein a first state and a second state are predefined for the opening/closing body, the second state being different from the first state; and
wherein the operating instruction information includes an instruction for cyclically switching between the first state and the second state.

8. The vehicular control device according to claim 1, wherein the opening/closing body includes at least one of a door, a door lock device, a window, and a side mirror.

9. A vehicular control device comprising:
an operating intention detection unit that is disposed on a tire or wheel rim of a vehicle and detects an operating intention of a user relative to an opening/closing body that is attached to the vehicle to open and close in a predefined manner;
an operating intention acquisition unit that is disposed on a vehicle body of the vehicle and acquires the operating intention;
an ID code acquisition unit that is disposed on the vehicle body of the vehicle and acquires, from a mobile device carried by the user, an ID code that identifies the user or the mobile device;
an ID code determination unit that is disposed on the vehicle body of the vehicle and determines whether the ID code is correct;
a condition establishment determination unit that is disposed on the vehicle body of the vehicle and determines, based on the operating intention of the user and on the result of ID code determination, whether an output condition for outputting operating instruction information that designates an operation of the opening/closing body is established; and
an output unit that is disposed on the vehicle body of the vehicle and outputs the operating instruction information when the output condition is established, wherein
the operating intension detection unit includes:

a vibration detection element that detects a vibration of the tire;

a signal processing circuit that processes a signal output from the vibration detection element; and an operating mode switching unit that switches the signal processing circuit to a regular operating mode when an output of the vibration detection element exceeds a predetermined value, and switches the signal processing circuit to a power-saving mode in which a power consumption is lower than in the regular operating mode when the output of the vibration detection element is lower than the predetermined value for a predetermined period of time and no processing is performed by the signal processing circuit, wherein the ID code acquisition unit and the ID code determination unit respectively serve as an ID code reception unit and a collation unit of a smart system, the smart system including: a polling signal output unit, which wirelessly outputs a polling signal for polling the mobile device; the ID code reception unit, which receives an ID code transmitted from the mobile device on the basis of the reception of the polling signal; the collation unit, which collates the received ID code with a master code stored in the collation unit; and an operation permission unit, which permits a predetermined operation on the basis of the result of collation.

* * * * *